No. 747,603. PATENTED DEC. 22, 1903.
J. P. GRABER.
WHEEL GAGE.
APPLICATION FILED NOV. 18, 1902.
NO MODEL.
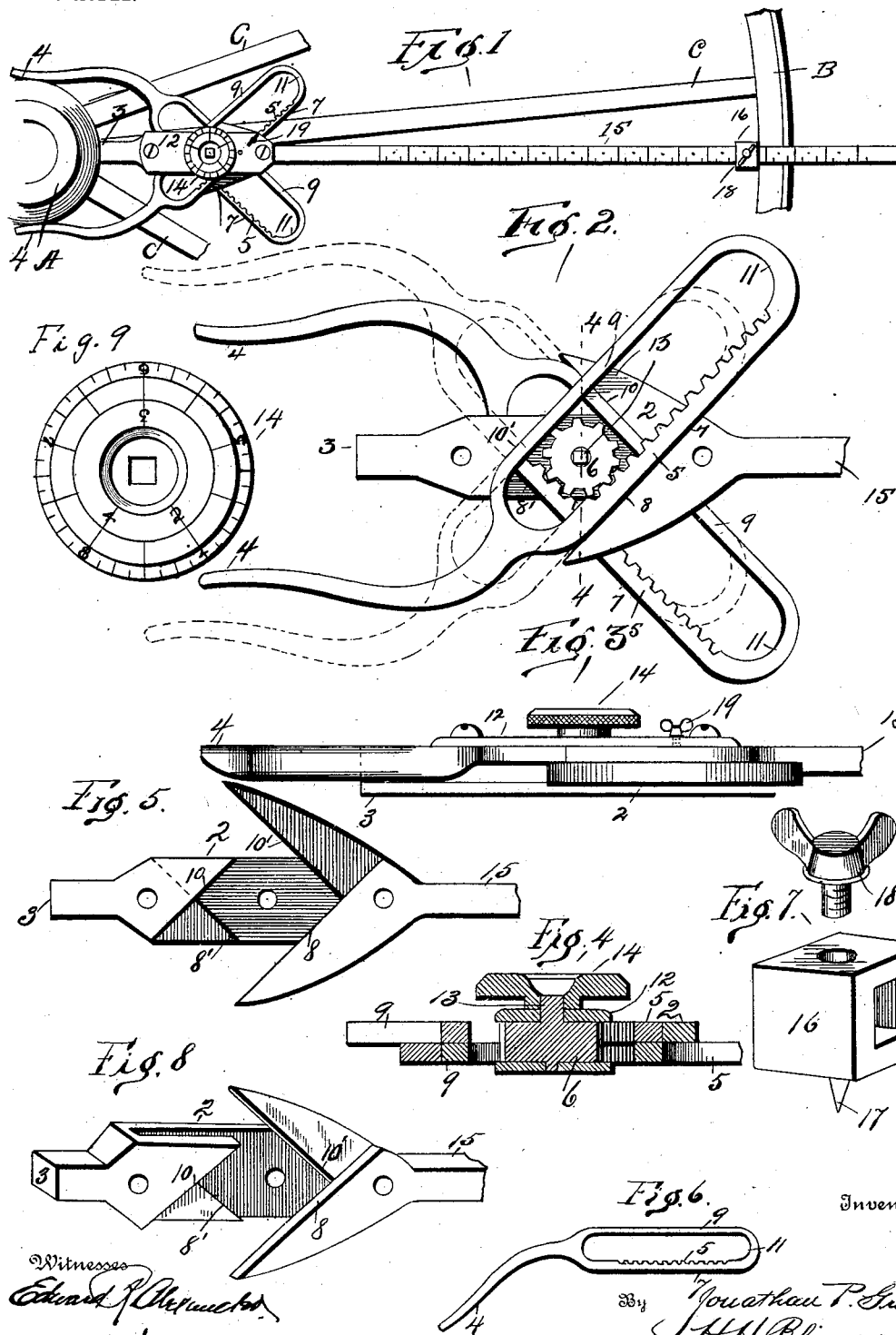

No. 747,603. Patented December 22, 1903.

UNITED STATES PATENT OFFICE.

JONATHAN P. GRABER, OF PRETTY PRAIRIE, KANSAS.

WHEEL-GAGE.

SPECIFICATION forming part of Letters Patent No. 747,603, dated December 22, 1903.

Application filed November 18, 1902. Serial No. 131,860. (No model.)

*To all whom it may concern:*

Be it known that I, JONATHAN P. GRABER, a citizen of the United States, residing at Pretty Prairie, in the county of Reno and State of Kansas, have invented certain new and useful Improvements in Wheel-Gages, of which the following is a specification, reference being had therein to the accompanying drawings.

My invention relates to a gage that is particularly adapted for use by wheelwrights, its object being to produce a gage or instrument by means of which the diameter and radius of the hub of a wheel may be easily, accurately, and quickly obtained; also, to produce an instrument by means of which the length of spokes required for a particular wheel may be easily and accurately ascertained, and also to produce an instrument by means of which the felly or rim of a wheel may be set exactly concentric with the hub.

While I have represented my invention as being embodied in a wheel-gage, it is evident that some or all of the features thereof may be adapted for other uses without departing from the principle of the invention.

In the drawings, Figure 1 is a side view of an adjustable wheel-gage embodying my improvements, a small portion of a vehicle-wheel being shown to assist in representing the use to which the invention may be put. Fig. 2 is an enlarged view of the part of the implement used for gaging the diameter of the hub, the parts being represented in two positions, one by full lines and the other by dotted lines. Fig. 3 is an edge view of the parts represented in Fig. 2. Fig. 4 is a sectional view taken on the line 4 4 of Fig. 2. Fig. 5 is a plan view of the supporting-frame-piece, in which the movable parts of the implement are mounted. Fig. 6 is a detached view of one of the adjustable gage-arms. Fig. 7 is a detached perspective view of the adjustable stop and marker used in gaging the spokes and felly or rim of the wheel. Fig. 8 shows the frame of the gage in perspective. Fig. 9 is a plan view of the graduated hand-wheel.

In the drawings, A designates a wheel-hub, B a part of the rim or felly thereof, and C certain of the spokes.

That part of my invention which has for its object the gaging of the hub comprises three contact members arranged to bear upon the surface of the hub, two of such members being arranged to engage with diametrically opposite points on such body and being movable relative to each other and to the other contact member, which is relatively stationary. With the movable contact members are combined means for adjusting them toward and from each other and so directing their movements that they shall always engage with the hub at diametrically opposite points and shall at all times maintain the same angular relations relative to the stationary contact member.

2 represents in a general way the frame in which the adjustable and movable parts of the gage are mounted. It is provided with a stationary contact-finger adapted to rest against the surface of the hub or other cylindrical body to be gaged. In this frame are mounted two adjustable contact members 4 4, that are arranged to engage with diametrically opposite points upon the surface of the hub, as clearly represented in Fig. 1. The movable contact members comprise arms that terminate in or are connected with the cogged racks 5 5, that are arranged to engage with a pinion 6, suitably mounted in the frame. In order to move the two contact-arms synchronously and along the proper lines, I prefer to arrange the cogged racks 5 in different planes and to make the teeth of the gear-wheel 6 sufficiently broad to engage such racks simultaneously and to provide means for properly directing the motions of the arms, for which purpose the rear outer faces 7 of the racks are straight and are arranged to move in close engagement with the guide-walls 8 8' of the frame 2. These guide walls or faces are arranged at right angles to each other and each at an angle of forty-five degrees to a line passing through the axis of the wheel and the point of engagement of the stationary contact member 3 with the wheel-hub. In order to hold each rack-bar in full and close engagement with its guide-wall, I prefer to combine with each adjustable arm a guide-bar 9, having a face parallel with the outer face 7 of the rack. These guide-bars move in close engagement with the guide walls or faces 10 10' of the frame 2, and these faces in turn are parallel with and arranged opposite to the guide-faces 8 8'. For convenience in construction each arm is formed integral with a yoke 11, as clearly represented in Figs. 2 and 6, one arm of the yoke constituting the rack 5 and the other the guide-bar 9. These yokes are superposed, one resting in a lower channel formed in the frame between the guide walls or faces 8' 10' and the other in an upper channel formed between the guide walls or faces 8 10. This arrangement of parts is very compact and insures a true movement of the gaging-arms, as the parallel faces between which their rearward extensions move are situated relatively far apart and may be sufficiently long to give broad and true bearings. The yokes provide spaces in which the pinion 6 may be mounted, so as to occupy a central position in the frame and yet engage with both the adjustable arms.

12 represents a cover-plate secured to the frame 2 and arranged to close the upper channel, in which the guiding extension of one of the movable arms is situated. Upon the shaft 13 of the pinion 6 is arranged a hand-wheel 14, by means of which the movable contact members are adjusted. I prefer to provide this wheel with two scales or sets of graduations which when read in connection with a pointer or line on the stationary frame will indicate, respectively, the diameter and the radius of the object being gaged. The figures on the outer series of graduations indicate diameter, while those on the same radius on the inner series are just one-half of the figures on the outer series and indicate the radius of the article to be gaged, as shown in Fig. 9.

The operation of the invention will be readily understood by reference to the drawings. The movable contact-arms are sufficiently separated to easily pass over the hub and the stationary contact 3 brought into engagement with its surface. The hand-wheel 14 is then turned so as to move the arms toward each other until they come into engagement with the surface of the hub. The construction of the instrument is such that when the three contact members 3 4 4 engage with the hub their points of contact are ninety degrees apart—that is, the point of engagement of each of the arms 4 is ninety degrees from that of the arm 3, and this is always the case whatever be the size of the article gaged.

15 designates an arm extending rearward from the frame 2. The axial line of this arm if continued would cut the axis of the wheel 6 and the point of engagement of the contact member 3 with the hub. Upon this arm is mounted an adjustable block 16, provided with a point or other marking device 17 and with a set-screw 18, by means of which it is secured in place upon the arm. The arm is graduated, as represented in Fig. 1, to indicate the length of spoke which will be required for a wheel with the hub of which the gage at the inner end of the arm is in engagement and with the felly or ring of which the adjustable block 16 is brought into engagement. The pointer or marker 17 is used to mark the spokes or rim to insure a perfectly-accurate concentric arrangement of these parts with reference to the hub. It will be readily understood that if the gage be adjusted to fit the hub and the arm 15 be then rotated about the hub while the three contact-points of the gage are maintained in engagement therewith the pointer will describe a circle that is exactly concentric with the hub, since the means described for engaging with the hub insure that the arm 15 shall always be radial to the hub, and therefore to the wheel, if the three contacts are simultaneously in engagement with the hub. As has been intimated, my invention is not limited in its useful application to a wheel-gage, but may be applied to a gage intended for other uses where it is desired to ascertain the diameter and radius of a cylindrical body, whether the diameter to be ascertained be external or internal, and that the other features of my invention are adapted for use in connection with many forms of gages.

19 represents a set-screw passing through the plate 12 and adapted to engage the upper surface of the rack 5 of the upper contact member 4 and to thereby lock the device when it is adjusted.

Having described my invention, what I claim, and desire to secure by Letters Patent, is—

1. In a gage for determining the diameter of a cylindrical body, the combination of a pair of contact-arms arranged at an angle to each other adapted to engage with diametrically opposite points on such body, means for directing the movements of said arms at said angle of arrangement to each other, and a wheel for simultaneously and equally moving the said arms and means for rotating said wheel provided with graduations adapted to indicate the diameter of the cylindrical body to be gaged, substantially as set forth.

2. In a gage for determining the diameter of a cylindrical body, the combination of a frame having a stationary contact member for engaging with the body and a pair of adjustable arms arranged to engage with diametrically opposite points on said body, each arm comprising a contact member, a rack-bar and a guide-bar, a wheel engaging with the said rack-bars for simultaneously and equally moving the arms toward and from each other, and means for directing the movements of the said arms, whereby they always engage with the body to be gaged at points ninety degrees from the point of engagement of the said stationary contact member, whatever be the size of the body gaged, substantially as set forth.

3. In a gage for determining the diameter of a cylindrical body, the combination of a frame, a pair of movable contact-arms arranged to engage with diametrically opposite points on the object to be gaged, having extensions mounted in the frame and arranged in superposed relations to each other, whereby they are allowed to cross, comprising a rack-bar and a guide-bar opposite to the rack-bar and means mounted in the frame for simultaneously moving the rack-bars, substantially as set forth.

4. In a gage for determining the diameter of a cylindrical body, the combination of a frame having guide-walls arranged at an angle of ninety degrees with reference to each other, adjustable contact-arms arranged to engage with diametrically opposite points on the article to be gaged, rack-bars connected with the said arms, a single gear-wheel arranged to engage with said racks to move the contact-arms, and guiding means connected respectively with the adjustable contact-arms and arranged on opposite sides of the said gear-wheel from the said rack-bars and adapted to move in engagement with the guide-walls of the frame, substantially as set forth.

5. In a gage for determining the diameter of a cylindrical body, the combination of a frame having a stationary contact member 3 and provided with channels arranged in different planes and having guiding edges disposed at right angles one to the other, the adjustable contact-arms arranged to engage with diametrically opposite points on the object to be gaged and provided with rearward-extending yokes 11 adapted to rest respectively in the said channels in the frame and to be guided by the walls thereof, each yoke being provided with a rack 5, and a gear-wheel mounted in the frame and arranged to engage with the racks 5 to simultaneously move the adjustable contact-arms, substantially as set forth.

6. In a gage, the combination of the frame provided with guide-walls, the pair of adjustable measuring-arms each comprising a forwardly-extending contact member and a rearwardly-extending rack-bar and a guide-bar mounted within the said frame and arranged to move in engagement with the guide-walls therein, and a wheel arranged within the frame and between said rack-bars and guide-bars and adapted to simultaneously and equally move the said measuring-arms, substantially as set forth.

7. In a gage, the combination of the frame, the pair of adjustable measuring-arms arranged to engage with diametrically opposite points on the body to be gaged, each comprising a forwardly-extending contact member and a rearwardly-extending guide-bar and a rack-bar, a wheel mounted within said frame and arranged between the said rack-bars and guide-bars, and adapted to simultaneously and equally move said measuring-arms, substantially as set forth.

8. In a gage, the combination of the frame having guide-walls, a pair of adjustable measuring-arms adapted to engage with diametrically opposite points on the article to be gaged, each comprising a forwardly-extending contact member and a rearwardly-extending rack-bar, a wheel mounted within said frame and adapted to engage with said rack-bars and to simultaneously and equally move said measuring-arms, and means arranged on opposite sides of said rack-bar adapted to guide the said measuring-arms within the frame, substantially as set forth.

9. In a gage, the combination of the measuring-arms each comprising a forwardly-extending contact member and a rearwardly-extending moving and guiding member, the frame having two pairs of guide-walls, one pair arranged at right angles to the other in superposed relation thereto and adapted to receive and have the said guiding members move in engagement therewith to insure the parallel movement of the contact portions of the measuring-arms, and means arranged between said guide-walls and adapted to engage with and simultaneously and equally move the said measuring-arms, substantially as set forth.

10. In a gage, the combination of the frame having two pairs of guide-walls, the pair of adjustable contact-arms arranged to engage diametrically opposite points of the article to be gaged each comprising a forwardly-extending contact member and a rearwardly-extending guiding member mounted in superposed relation to each other and extending through said frame and arranged to move in engagement with the guide-walls thereof, and means mounted within said frame for simultaneously and equally moving said adjustable contact-arms, substantially as set forth.

11. In a gage, the combination of the frame, the pair of adjustable contact-arms arranged to engage diametrically opposite points on the article to be gaged each comprising a forwardly-extending contact member and a rearwardly-extending guiding member, mounted in superposed relation to each other, means for simultaneously and equally moving said contact members, and guiding means engaging the said rearward extensions of said arms on both sides thereof and adapted to maintain the parallelism of the contact portions of said arms in the different positions in which they may be adjusted, substantially as set forth.

12. In a gage for use by wheelwrights, the combination of a frame 2 having the graduated arm 15 extending in one direction therefrom and a contact member 3, arranged to engage with the wheel-hub in the line of the arm extending in the other direction therefrom, the adjustable contact members mounted in superposed relation to each other and extending through the frame and arranged to engage with diametrically opposite points on the hub, guiding means on the frame on both sides of each of the adjustable contact members for causing them to engage with the hub at ninety degrees respectively on either side of the point of engagement of the stationary contact member 3, and means for simultaneously and equally moving the points of the contact parts toward and from each other, substantially as set forth.

13. In a gage, the combination of the pair of adjustable contact-arms, the frame having the contact member 3, the graduated arm 15, these parts being in line with each other and rigidly secured together and having the superposed guide-walls for the said contact members arranged between said contact member 3 and graduated arms 15, and means for simultaneously and equally moving the adjustable contact-arms, substantially as set forth.

14. In a gage, the combination of the pair of adjustable contact-arms, the frame having a contact member 3 and an arm 15 these parts being arranged in line with each other and rigidly connected together, and having two pairs of guide-walls arranged in superposed relation to each other, each pair adapted to guide one of the said contact-arms, and means for simultaneously and equally moving said arms, substantially as set forth.

15. In a gage, the combination of the frame, a pair of adjustable measuring-arms adapted to engage with diametrically opposite points on the article to be gaged, each comprising a forwardly-extending contact member and a rearwardly-extending guide member, means adapted to engage with said guide member to insure the parallel movement of the contact portions of the measuring-arms, and means arranged between the last-described means for simultaneously and equally moving said arms, substantially as set forth.

In testimony whereof I affix my signature in presence of two witnesses.

JONATHAN P. GRABER.

Witnesses:
JNO. P. O. GRABER,
F. B. HAMLIN.